(12) United States Patent
Coppinger

(10) Patent No.: US 9,544,303 B2
(45) Date of Patent: *Jan. 10, 2017

(54) SYSTEM AND DEVICE FOR CONSOLIDATING SIM, PERSONAL TOKEN, AND ASSOCIATED APPLICATIONS FOR SELECTING A TRANSACTION SETTLEMENT ENTITY

(75) Inventor: Paul D. Coppinger, Mesa, AZ (US)

(73) Assignee: Apriva, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/982,300

(22) Filed: Dec. 30, 2010

(65) Prior Publication Data

US 2011/0237296 A1 Sep. 29, 2011

Related U.S. Application Data

(63) Continuation-in-part of application No. 12/910,611, filed on Oct. 22, 2010.
(Continued)

(51) Int. Cl.
*H04B 1/38* (2015.01)
*H04L 29/06* (2006.01)
(Continued)

(52) U.S. Cl.
CPC .......... *H04L 63/0853* (2013.01); *G06Q 20/20* (2013.01); *G06Q 20/32* (2013.01);
(Continued)

(58) Field of Classification Search
CPC ...... H04W 4/008; H04W 48/18; H04W 88/06; H04W 4/001; H04W 12/06; H04W 4/24; H04W 4/00; H04W 88/02; H04W 4/003; G07F 7/1008; G07F 7/0886; G07F 7/08; G07F 19/201; G07F 7/005; G07F 7/1025; G07F 7/1083; G07F 7/0826; G06Q 20/341; G06Q 20/352; G06Q 20/3674; G06Q 20/105; G06Q 20/40145; G06Q 20/10; G06Q 20/32; G06Q 20/04; G06Q 20/40975; G06Q 20/322; G06Q 20/34; G06Q 20/20; G06Q 20/204; G06Q 20/3278; G06Q 20/3227; G06Q 30/06; G06Q 40/00
(Continued)

(56) References Cited

U.S. PATENT DOCUMENTS 6,314,425 B1 11/2001 Serbinis et al.
7,437,158 B2 10/2008 Russell
(Continued)

FOREIGN PATENT DOCUMENTS

KR 1020070051817 A 5/2007
KR 1020080019129 A 3/2008
(Continued)

OTHER PUBLICATIONS

International Search Report and Written Opinion dated Jun. 21, 2011, PCT/US2010/053829.
(Continued)

*Primary Examiner* — Fred Casca
(74) *Attorney, Agent, or Firm* — Law Offices of David O. Caplan, PLLC

(57) ABSTRACT

The present invention relates generally to a smart card device that is configured to facilitate wireless network access and credential verification. Specifically, the device is configured to meet the physical and electrical specification for commercially available mobile devices utilizing a standard Subscriber Identity Module (SIM) for network access. The device combines the features of the SIM with Common Access Card or Personal Identity Verification card features to allow a network subscriber to invoke secure payment
(Continued)

transactions over a carrier's network. The system includes data storage for maintaining a plurality of network and transaction instrument profiles and a profile gateway for receiving transaction information from a payment gateway, sending an authorization request to a user's mobile device, receiving a transaction authorization from the mobile device, and sending transaction information to a payment gateway to finalize the payment transaction.

6 Claims, 3 Drawing Sheets

Related U.S. Application Data

(60) Provisional application No. 61/254,527, filed on Oct. 23, 2009.

(51) Int. Cl.
　　*G06Q 20/20*　　(2012.01)
　　*G06Q 20/32*　　(2012.01)
　　*G06Q 20/40*　　(2012.01)
　　*H04L 29/08*　　(2006.01)

(52) U.S. Cl.
　　CPC ..... *G06Q 20/3229* (2013.01); *G06Q 20/3278* (2013.01); *G06Q 20/40* (2013.01); *H04L 67/306* (2013.01)

(58) Field of Classification Search
　　USPC .............. 705/41, 44, 67, 17, 35, 39, 65, 66, 26.1,705/14.15; 235/449; 455/41.1, 411, 414.1, 41.2, 455/466, 418; 713/172, 184
　　See application file for complete search history.

(56) References Cited

U.S. PATENT DOCUMENTS

| | | |
|---|---|---|
| 7,542,943 B2 | 6/2009 | Caplan et al. |
| 2002/0073339 A1 | 6/2002 | Card |
| 2002/0128977 A1* | 9/2002 | Nambiar ................. G06F 21/34 705/64 |
| 2003/0008637 A1 | 1/2003 | Vatanen |
| 2003/0060186 A1 | 3/2003 | Lehto |
| 2003/0150915 A1 | 8/2003 | Reece |
| 2004/0010462 A1 | 1/2004 | Moon et al. |
| 2004/0019564 A1 | 1/2004 | Goldthwaite |
| 2004/0210449 A1* | 10/2004 | Breck et al. ...................... 705/1 |
| 2004/0267618 A1 | 12/2004 | Judicibus et al. |
| 2006/0000900 A1 | 1/2006 | Fernandes et al. |
| 2006/0196931 A1 | 9/2006 | Holtmanns et al. |
| 2006/0258337 A1 | 11/2006 | Fujita et al. |
| 2007/0011099 A1* | 1/2007 | Sheehan ................. G06Q 20/32 705/65 |
| 2007/0203850 A1 | 8/2007 | Singh et al. |
| 2007/0377032 | 11/2007 | Relyea |
| 2007/0295803 A1* | 12/2007 | Levine ................... G06Q 20/04 235/379 |
| 2008/0034411 A1 | 2/2008 | Aoyama |
| 2008/0041951 A1 | 2/2008 | Adams et al. |
| 2008/0091614 A1 | 4/2008 | Bas Bayod et al. |
| 2008/0096559 A1 | 4/2008 | Phillips et al. |
| 2008/0116285 A1 | 5/2008 | Shoemaker |
| 2008/0120243 A1 | 5/2008 | Lakin |
| 2008/0182621 A1 | 7/2008 | Morman |
| 2008/0242267 A1 | 10/2008 | Soni |
| 2008/0313047 A1* | 12/2008 | Casares ................. G06Q 20/10 705/17 |
| 2008/0320577 A1 | 12/2008 | Larduinat |
| 2009/0011648 A1 | 1/2009 | Kargl et al. |
| 2009/0024728 A1 | 1/2009 | Russell |
| 2009/0030842 A1 | 1/2009 | Hoffman et al. |
| 2009/0030843 A1 | 1/2009 | Hoffman |
| 2009/0037326 A1 | 2/2009 | Chitti |
| 2009/0075592 A1 | 3/2009 | Nystrom et al. |
| 2009/0125446 A1 | 5/2009 | Saunders et al. |
| 2009/0281947 A1 | 11/2009 | Erel |
| 2009/0287935 A1 | 11/2009 | Aull |
| 2010/0006639 A1 | 1/2010 | Spaeth et al. |
| 2010/0069039 A1* | 3/2010 | Kawamura et al. .......... 455/410 |
| 2010/0096452 A1 | 4/2010 | Habraken |
| 2010/0217707 A1 | 8/2010 | Phillips |
| 2011/0193718 A1 | 8/2011 | Chevrette |
| 2012/0136795 A1* | 5/2012 | Hoffman et al. ............... 705/66 |

FOREIGN PATENT DOCUMENTS

| | | |
|---|---|---|
| KR | 1020090015557 | 2/2009 |
| WO | 2008105184 | 9/2008 |
| WO | 2009039535 | 3/2009 |

OTHER PUBLICATIONS

Non Final Office Action dated Feb. 16, 2012, U.S. Appl. No. 12/910,611.
Non Final Office Action dated Apr. 2, 2012, U.S. Appl. No. 13/325,205.
Non Final Office Action dated Apr. 10, 2012, U.S. Appl. No. 13/325,256.
Non Final Office Action dated Apr. 2, 2012, U.S. Appl. No. 13/325,231.
Non Final Office Action dated Mar. 28, 2012, U.S. Appl. No. 13/325,247.
Non Final Office Action dated Jun. 6, 2012, U.S. Appl. No. 12/982,313.
International Preliminary Report on Patentability, PCT/US2010/053829 dated Apr. 24, 2012.
Final Office Action dated Aug. 16, 2012 in U.S. Appl. No. 12/910,611.
Office Action dated Aug. 17, 2012 in U.S. Appl. No. 12/982,241.
Office Action dated Aug. 20, 2012 in U.S. Appl. No. 12/982,285.
Office Action dated Aug. 29, 2012 in U.S. Appl. No. 12/982,228.
International Search Report and Written Opinion dated Sep. 27, 2012 in Application No. PCT/US2012/028540.
Final Office Action dated Oct. 2, 2012 in U.S. Appl. No. 13/325,205.
Final Office Action dated Oct. 2, 2012 in U.S. Appl. No. 13/325,231.
Final Office Action dated Oct. 2, 2012 in U.S. Appl. No. 13/325,256.
Office Action dated Oct. 17, 2012 in U.S. Appl. No. 13/045,936.
Final Office Action dated Oct. 24, 2012 in U.S. Appl. No. 13/325,247.
Office Action dated Nov. 28, 2012 in U.S. Appl. No. 12/982,271.
Office Action dated Dec. 14, 2012 in U.S. Appl. No. 12/982,211.
Final Office Action dated Jan. 29, 2013 in U.S. Appl. No. 12/982,313.
Final Office Action dated Jun. 18, 2014 in U.S. Appl. No. 12/910,611.
Office Action dated Jun. 18, 2014 in U.S. Appl. No. 13/325,205.
Final Office Action dated Jul. 23, 2014 in U.S. Appl. No. 13/325,256.
Office Action dated Aug. 18, 2014 in U.S. Appl. No. 13/045,936.
Extended Search Report dated Aug. 28, 2014 in European Application No. 10825776.7.
Reveilhac, et al., "Promising Secure Element Alternatives for NFC Technology", Proceedings 2009 First International Workshop on Near Field Communication, NFC 2009, Feb. 24, 2009, pp. 75-80.
Final Office Action dated Feb. 13, 2013 in U.S. Appl. No. 12/982,285.
Final Office Action dated Feb. 14, 2013 in U.S. Appl. No. 12/982,241.
Office Action dated Apr. 8, 2013 in U.S. Appl. No. 12/910,611.
Office Action dated Apr. 15, 2013 in U.S. Appl. No. 13/325,256.
Final Office Action dated Jun. 4, 2013 in U.S. Appl. No. 13/045,936.
Final Office Action dated Jun. 4, 2013 in U.S. Appl. No. 12/982,228.
Office Action dated Jul. 31, 2013 in U.S. Appl. No. 13/325,231.
Final Office Action dated Jul. 31, 2013 in U.S. Appl. No. 13/325,313.

(56) References Cited

OTHER PUBLICATIONS

Final Office Action dated Aug. 14, 2013 in U.S. Appl. No. 13/325,247.
Final Office Action dated Aug. 14, 2013 in U.S. Appl. No. 13/325,205.
Final Office Action dated Sep. 12, 2013 in U.S. Appl. No. 12/982,211.
Final Office Action dated Sep. 12, 2013 in U.S. Appl. No. 12/982,271.
International Preliminary Report on Patentability dated Sep. 26, 2013 in Application No. PCT/US2012/028540.
Final Office Action dated Oct. 4, 2013 in U.S. Appl. No. 13/325,256.
Final Office Action dated Nov. 5, 2013 in U.S. Appl. No. 12/910,611.
Final Office Action dated Feb. 26, 2014 in U.S. Appl. No. 13/325,231.
Final Office Action dated Feb. 26, 2014 in U.S. Appl. No. 13/325,247.
Final Office Action dated Mar. 31, 2014 in U.S. Appl. No. 12/982,313.
Office Action dated Nov. 20, 2014 in U.S. Appl. No. 12/982,271.
Office Action dated Nov. 21, 2014 in U.S. Appl. No. 12/982,211.
Final Office Action dated Dec. 4, 2014 in U.S. Appl. No. 12/982,313.
Office Action dated Nov. 21, 2014 in U.S. Appl. No. 13/325,231.
Office Action dated Dec. 26, 2014 in U.S. Appl. No. 12/982,228.
Office Action dated Dec. 29, 2014 in U.S. Appl. No. 13/325,247.
Final Office Action dated Jan. 28, 2015 in U.S. Appl. No. 13/325,205.
Final Office Action dated Mar. 6, 2015 in U.S. Appl. No. 13/045,936.

* cited by examiner

300

```
┌─────────────────────────────────────┐
│ HOST APPLICATION REGISTERS SUBSCRIBER TO │
│            NETWORK                  │
│              305                    │
└─────────────────────────────────────┘
                  │
                  ▼
┌─────────────────────────────────────┐
│   CSP VERIFIES IDENTITY OF THE USER │
│              310                    │
└─────────────────────────────────────┘
                  │
                  ▼
┌─────────────────────────────────────┐
│   CSP READS RECORD FROM NACV MODULE │
│              315                    │
└─────────────────────────────────────┘
                  │
                  ▼
┌─────────────────────────────────────┐
│  CSP IDENTIFY PIV AND CREATE FILE-WRITE │
│            OPERATION                │
│              320                    │
└─────────────────────────────────────┘
                  │
                  ▼
┌─────────────────────────────────────┐
│   CONVERT "FILE-WRITE COMMAND" TO ISO │
│            COMMAND                  │
│              325                    │
└─────────────────────────────────────┘
                  │
                  ▼
┌─────────────────────────────────────┐
│ HOST APPLICATION ISSUES "READ" COMMAND │
│ TO A DIPATCHER TO DETERMINE RESPONSE │
│              330                    │
└─────────────────────────────────────┘
                  │
                  ▼
┌─────────────────────────────────────┐
│  DISPATCHER RECEIVES AND PROCESSES  │
│ "READ" COMMAND TO IDENTIFY A DEST APPLET │
│              335                    │
└─────────────────────────────────────┘
                  │
                  ▼
┌─────────────────────────────────────┐
│    DISPATCHER SENDS REQUEST TO THE  │
│         DESTINATION APPLET          │
│              340                    │
└─────────────────────────────────────┘
```

SYSTEM AND DEVICE FOR CONSOLIDATING SIM, PERSONAL TOKEN, AND ASSOCIATED APPLICATIONS FOR SELECTING A TRANSACTION SETTLEMENT ENTITY

CROSS REFERENCE TO RELATED APPLICATIONS

This application claims priority to, and is a continuation-in-part of, U.S. Ser. No. 12/910,611, filed Oct. 22, 2010, and entitled "System and Device for Consolidating SIM, Personal Token, and Associated Applications." This application also claims benefit from U.S. Provisional Patent Application Ser. No. 61/254,527, filed Oct. 23, 2009, which is hereby incorporated by reference.

FIELD OF THE INVENTION

The disclosed system and device combines the features of a Subscriber Identity Module (SIM) with those of a smart card-based personal token. The unification of these features results in a Network Access and Credential Verification (NACV) module that may be included in a Global System for Mobile Communications (GSM) device to provide both network features and secure personal token features. The disclosed NACV module may be used in association with other features of the invention to facilitate secure and convenient electronic transactions utilizing a variety of mobile communication devices.

BACKGROUND

While the memory card concept has been in existence since the early 1970's, the first automated chip card was not invented until the 1980's. In 1983, a French inventor created the first known automated chip card (smart card). The earliest mass use of the smart card was for facilitating payment for use of French pay phones. The second known use of smart card technology occurred nearly a decade later with a French payment card, which facilitated PIN-less payment transactions at toll roads. Soon thereafter, smart cards became widely implemented in markets having a need for highly secure portable tokens capable of facilitating financial transactions.

As used herein, a portable token includes security information for authenticating and identifying a user, the user's groups, and the user's privileges. Smart cards, chip cards, or Integrated Circuit Cards (ICC) often comprise credit card sized instruments with embedded integrated circuits configured to process data. In general, a smart card receives input, which is processed by way of ICC applications and then delivered as an output. There are two broad categories of ICCs. Memory cards include only non-volatile memory storage components and perhaps some specific security logic, while microprocessor cards include volatile memory and microprocessor components for performing more complex tasks.

As the smart card was gaining traction in the financial services market, the first Subscriber Identity Module (SIM) card was produced by a Munich smart card manufacturer. A Finnish wireless network carrier was the first to implement the SIM card to allow mobile devices to access and operate within the operator's network. Other network carriers followed soon thereafter, utilizing SIM cards to connect mobile devices to their cellular networks and provide subscribers with universally available services such as call roaming.

As used herein, a network carrier comprises, for example, a Global System for Mobile Communications (GSM) carrier. GSM is presently the most popular standard for mobile telephony systems in the world. GSM comprises ubiquitous standards that enable international roaming arrangements between mobile network operators, allowing subscribers to utilize their mobile devices in many parts of the world to facilitate voice calls, receive electronic mail, send SMS messages, access the Internet, and the like. Specifically, GSM is a cellular network, which means that mobile devices connect to it by searching for cells in the immediate vicinity.

As used herein, SIM cards store network-specific information used to authenticate and identify subscribers on a network. The most important of these are the ICC-ID, IMSI, Authentication Key (Ki), Local Area Identity (LAI), and Operator-Specific Emergency Number. SIM cards also store other carrier specific information such as, for example, the SMSC (Short Message Service Center) number, Service Provider Name (SPN), Service Dialing Numbers (SDN), Advice-Of-Charge parameters, and Value Added Service (VAS) applications.

Common Access Cards (CAC) and Personal Identity Verification (PIV) are personal token standards, which have been implemented by various governmental and commercial entities. CAC and PIV cards (personal token cards) are smart cards with very specialized functionality directed toward identity verification and access control. Personal token cards are designed to control access to computer networks, enable users to sign documents electronically, encrypt email messages, and enter controlled facilities. For example, CAC is issued to all active duty military, Reserves, National Guard, and Department of Defense (DoD) civilians who need access to DoD facilities or DoD computer network systems.

As used herein, personal token cards operate under electrical and mechanical principles similar to those of SIM cards; however, provide a distinct set of features. Personal token cards are configured to facilitate a variety of cryptographic functions including, for example, confidentiality, non-repudiation, tamper proofing, identity validation, and etc. Specifically, a personal token card is a hard-token personal authentication device that reliably protects a user's information and provides strong cryptographic operations. Unlike a GSM SIM, which is based on proprietary, vendor specific software; personal token cards are based on the Java Card specification. The Java Card specification is a subset of the Java programming language specifically targeted at embedded devices.

To summarize, SIM cards provide GSM features to facilitate network connectivity in accordance with defined connectivity protocols, while personal token cards such as CAC and PIV cards, provide personal identity verification and access control. Combined, the features of a SIM card and personal token card facilitate secure and reliable exchange of data over a specific established network. Conventional systems and methods utilizing the described technologies require a communication device (i.e., a cellular phone) to be configured to physically receive both types of cards. One drawback to this conventional card architecture is that mobile devices having features requiring a separate personal token card also require a separate reader device for extracting data from the personal token card for token validation. As such, a need exists for a single device that is configured with both network protocol and personal token features such as those provided by CAC and PIV cards.

Increasing consumer demands for alternative payment options combined with a desire by merchants to accept electronic payments with limited restrictions have led to a number of innovations directed toward mobile payments. Likewise, hardware and software developers have sought to expand the functionality of mobile devices to close gaps between buyers and sellers. These efforts produced newer generations of data compression and wireless networking protocols, enabling existing radio-based networks to efficiently move large amounts of data. While tremendous advancements have been made in this regard, questions remain as to how to most effectively protect the integrity of sensitive data as it traverses data networks.

Consumers and merchants have benefited from the convenience of electronic commerce on a larger scale; however, the full promise of mobile payment has not been realized due to remaining deficiencies in the ability to secure sensitive information. Islands of technology remain, which have not been bridged by secure, reliable, and efficient communication architectures. In other words, the ability to create and consume meaningful data at a mobile device has outpaced the ability to securely move that data from point to point over a network.

As such, there is a need for an alternative payment processing system, wherein merchants can utilize their preferred devices and network carriers without being required to purchase additional software and/or hardware. Moreover, a need exists for a system and device configured to protect sensitive information from being compromised as it moves between various points on a network. Specifically, the system should provide merchants with a simple and reliable method to accept and process transaction instruments remotely without compromising security standards. Specifically, the system and device should provide increased data security, improved efficiency, reduced operating costs, and enhanced customer experience.

SUMMARY OF THE INVENTION

In general, the present invention overcomes the limitations and problems of prior art systems by providing a system and device that eliminates the need to accommodate both a personal token card (and card reader) and a network SIM card within a mobile device, herein referred to as a "communication device." The invention combines the features of these two smart card architectures to create a Network Access and Credential Verification (NACV) module, capable of facilitating secure and convenient electronic transactions with minimal dependence on additional hardware.

A communication device (e.g., cellular phone) equipped with the NACV module may, for example, also function as a transaction instrument reader (e.g., a Point of Sale terminal). Accordingly, the invention includes a native transaction manager application that is installed at the communication device. Specifically, the transaction manager provides an interface for entry of a Personal Identification Number (PIN). In one embodiment, the communications between the communication device, profile gateway, POS device, and any other entity may be by way of the Short Message Peer-to-Peer (SMPP) protocol, which is commonly available through most communication devices. For example, through properly encoded Short Message Service (SMS) transmissions, the personal token capabilities of the NCAV module may be invoked remotely from another communication device, server, web site, domain controller, and the like. This transmission enables the communication device to serve as a means for providing both authentication and access control features. Requests to sign or otherwise provide non-repudiation for a transaction may be implemented in similar fashion.

In one embodiment, a payment transaction may be conducted locally utilizing short-range communication technologies such as, for example, Near Field Communication (NFC) or Bluetooth. Accordingly, a payment authorization request is transmitted to the communication device by way of, for example, a Bluetooth equipped POS device. The payment authorization request is then routed to the communication device NACV module by way of the Single-Wire Protocol (SWP) or, on a smart phone, a specialized payment application. In either case, the NACV module may use a SMPP browser, which is typically provided by the operating environment of most modern communication devices, to present details of the requested payment transaction to the user and to request the user's authorization.

An authorization process may be invoked by a requesting entity (e.g., a POS device or gateway server) sending an authorization request to a communication device. Receipt of an authorization request invokes an application at the communication device, which prompts the user for authorization. The authorization process may comprise a single factor such as, for example, a positive affirmation by the user. However, the authorization may comprise multiple factors, such as entry of a PIN and/or presentation of a biometric sample (e.g., voiceprint). Entry of authorization credentials invokes creation of an authorization response. The authorization response may take the form of a cryptogram, which is computed by the communication device using private cryptographic credentials that are maintained by the NACV module. The authorization response may be transmitted back to the requesting entity along the same path as the payment authorization request (e.g., Bluetooth).

In one embodiment, the NACV module includes a memory element for storing a plurality of transaction instrument profiles. An interface element receives a selection of a first transaction instrument profile from the plurality of transaction instrument profiles. A processor element in communication with the memory element and the interface element is configured to transmit a first payment entity parameter stored within the first transaction instrument profile to a gateway server to facilitate a transaction. When the transaction is authorized, the processor element receives a first confirmation from the gateway server based on the transaction. After authorization but prior to transaction settlement, the user may select a second transaction parameter and the processor element transmits a second payment entity parameter stored in the second transaction instrument profile to the gateway server. In response, the gateway server modifies the settlement entity identifier for the transaction from the entity identified in the first transaction instrument profile to the entity identified in the second transaction instrument profile.

BRIEF DESCRIPTION OF EXEMPLARY DRAWINGS

A more complete understanding of the present invention may be derived by referring to the detailed description and claims when considered in connection with the Figures, wherein like reference numbers refer to similar elements throughout the Figures, and:

FIG. 3 is a flow diagram illustrating a messaging process between an NACV equipped transaction instrument and a profile gateway in accordance with an exemplary embodiment of the present invention.

DETAILED DESCRIPTION OF EXEMPLARY EMBODIMENTS

Figure 1:
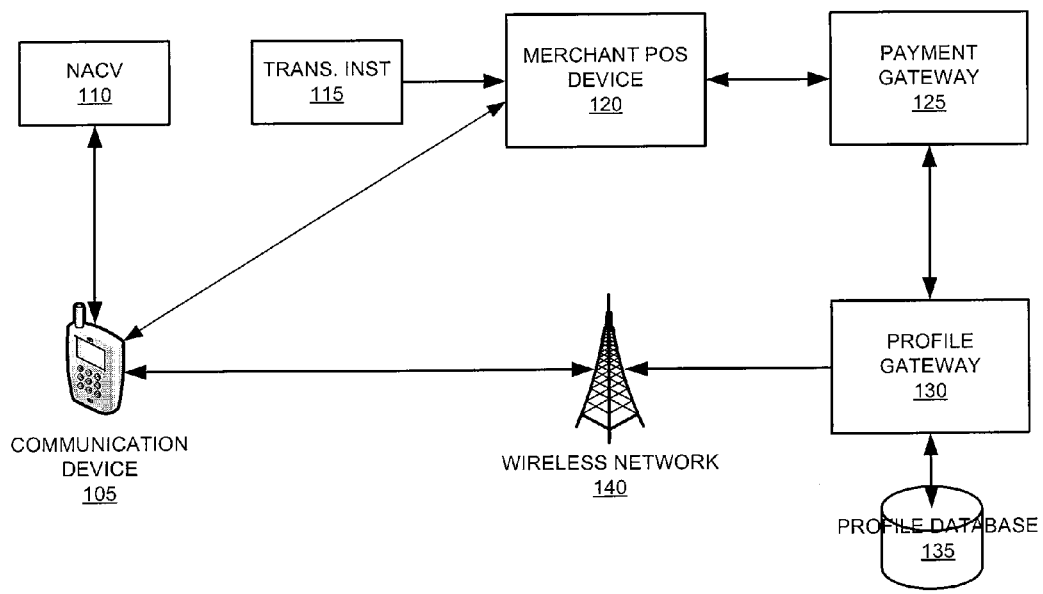
FIG. 1 is a system diagram illustrating system components for facilitating secure network transactions in accordance with an exemplary embodiment of the present invention.

In general, the present invention uniquely provides an efficient and highly secure means for facilitating identity verification and transaction authorization. More specifically, the disclosed system and device provides a secure means for communicating various forms of information from a remote communication device through a carrier network. Accordingly, and in one embodiment, the invention combines the functionality of a standard SIM with that of a smart card based personal token to allow a user to provide authentication credentials, view transaction information, select a transaction instrument, and authorize a transaction.

A communication device (e.g., cellular phone), as used herein, includes a unique Network Access and Credential Verification (NACV) module that is a single-device solution combining the features of a GSM, 4G, or other wireless network SIM with those of a smart card based personal token, such as a CAC or PIV card, and a financial payment instrument, such as an EMV credit card. The NACV module enables the communication device to simultaneously provide wireless network functions and personal token functions including, for example, cryptographic key establishment, management digital signatures, identity validation, secured communications, legal non-repudiation, authenticated and secured payment transactions, and a variety of access control capabilities.

Those of ordinary skill in the art will appreciate that the disclosed NACV module is not limited to a single carrier GSM and a single personal token. The present invention includes the capability of maintaining any number of network profiles; each corresponding to a specific network carrier and a personal token such as, for example, CAC, PIV, EMV, MIFARE, and the like. As will be described in greater detail herein, personal tokens corresponding to different transaction accounts may be maintained in order to enable a single communication device to facilitate electronic payments from a selected transaction account.

In one embodiment, because the NACV module is configured to maintain multiple profiles that are each associated with transaction instruments, the user is able to select which instrument is used to facilitate payment for a purchase transaction for "cashless" transactions. As is known by those of ordinary skill in the art, a "cashless" transaction authorization does not result in immediate transfer of funds to the merchant. Instead, the authorization may be viewed as a commitment by the issuing institution (i.e., bank) to transfer funds to the merchant's bank account upon demand at a future time. In many cases, this authorization may take up to three business days. As such, it is feasible that a user could select a first transaction instrument profile (e.g., Visa Credit Card) to execute a payment transaction and thereafter, select a second transaction instrument profile (e.g., Visa Debit Card) to complete the payment.

For the duration falling between the times of transaction processing and payment commitment, systems and methods are provided to enable a payment processor to attempt to locate alternate, lower-cost methods to pay the merchant. In other words, the payment processor (i.e. gateway) may authorize completion of a transaction and then shop for an optimum issuing institution to finalize the transfer of funds to the seller's account. If a lower-cost method is identified and sufficient funds are verifiably transferred within the authorization timeframe, then the original authorization is allowed to expire. If a source other than the original issuer is not located, then the authorization is converted into a settlement in the traditional fashion. In accordance with this embodiment, it should be noted that risk to the merchant is minimized by keeping the original authorization in force and ready to be utilized should an alternative settlement arrangement not be identified.

The disclosed communication device may incorporate near-field communication by way of, for example, NFC or Bluetooth to provide a means for local authentication. While this embodiment may be well suited for majority of modern GSM "feature" devices, specialized applications may be provided via smart phones to improve the user experience and provide higher order functionality. Vertical applications (e.g., email, instant messaging, etc.) may invoke a protocol interface to the NACV module in order to improve security without a need for a separate personal token reader or similar device.

Within the context of the above embodiment, the NACV equipped communication device functions in a manner similar to an NFC-enabled transaction instrument (e.g., a debit card). As such, the communication device may utilize an authorized Bank Identification Number (BIN) range and may be linked to the user's Direct Deposit Account (DDA) such that fraud risk is mitigated. On the back end, the NACV equipped communication device may function as a pre-paid transaction instrument, which may be linked to a DDA using a periodic "top-up" approach to mitigate fraud risk. In other words, this may be thought of as a modified "decoupled debit" approach to managing fraud risk and reducing liability.

Known NFC-enabled transaction instruments are configured to support international card-based presentation methods. The presentation method may include traditional magnetic strip, traditional EMV, track data via NFC, EMV protocol through NFC, or a combination thereof. As with traditional NFC-enabled transaction instruments, the disclosed NACV module is encoded using international industry standards; therefore, the communication device may be used to facilitate payment transactions at most POS devices, including those that are not linked to the specific provider's payment gateway.

As used herein, a "communication device" may comprise any hardware, software, or combination thereof, configured to invoke and/or facilitate communication and/or transactions over a carrier network. More specifically, it should be noted that the communication device may be embodied as any combination of hardware and/or software components configured to interact with various other hardware and/or software components to facilitate the disclosed identity verification and electronic payment features. For example, the communication device may include the physical form of the disclosed NACV module and/or software modules maintained within any electronic or physical memory structure. Moreover, practitioners will appreciate that the terms "communication device", "NACV module", "transaction instrument", "smart phone", "mobile phone", and "cell phone" be used interchangeably without departing from the scope of the invention.

In addition, it should be noted that although the invention is described with respect to a communication device, the invention is not so limited. The NACV module is suitable for any device or instrument capable interfacing the NACV module and storing distinct data sets, which may be provided by multiple distinct entities where the distinct data sets may be formatted, one different from another. Each data set may correspond to accounts comprising, for example, a calling card, a loyalty, debit, credit, incentive, direct debit, savings, financial, membership account or the like. While the information provided by the account issuers may be described as being "owned" by the issuers, the issuers or their designees may simply be managers of the account.

As used herein, the terms "user," "end user," "consumer," "customer", "cardholder", "accountholder", or "participant" may be used interchangeably with each other, and each shall mean any person, entity, machine, hardware, software, and/or business. Furthermore, the terms "business" or "merchant" may be used interchangeably with each other and shall mean any person, entity, machine, hardware, software, or business. Further still, the merchant may be any person, entity, software, and/or hardware that is a provider, broker, and/or any other entity in the distribution chain of goods or services.

Communication between various entities of the invention is accomplished through any suitable communication means, such as, for example, a telephone network, intranet, Internet, payment network, online communications, off-line communications, wireless communications, and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, decryption, compression, decompression, and/or the like.

As disclosed herein, the NACV module allows the communication device to facilitate transactions in cooperation with, or in the place of, a transaction instrument. The invention reduces or eliminates the user's need to provide sensitive account information to a merchant or any other party by performing both user verification and transaction instrument validation at the communication device, effectively bypassing the merchant POS device. As such, many of the features described in the context of a traditional transaction instrument are applicable to the disclosed NACV module. While there may or may not be a direct correlation between various physical and electrical characteristics of the NACV module to those of the described transaction instrument, practitioners will appreciate that similarities between these characteristics may vary in accordance with particular implementations. For example, a smart card may execute a credential verification application in response to receiving a validation request from a POS device. Likewise, the disclosed NACV module may invoke a credential verification application in response to receiving a verification request from a profile or payment gateway.

A transaction instrument may communicate to the merchant, information from one or more data sets associated with the transaction instrument. In one example, membership data and credit card data associated with a transaction account or device may be transmitted using any conventional protocol for transmission and/or retrieval of information from an account or associated transaction card (e.g., credit, debit, gift, stored value, loyalty, etc.). In another embodiment, a transaction instrument may comprise an electronic coupon, voucher, or other such instrument. In yet another embodiment, the transaction instrument may be configured to communicate via Radio Frequency (RF) signals. As such, the data maintained by the transaction instrument may be communicated via RF signals.

The transaction instrument in accordance with this invention may be used to pay for acquisitions, obtain access, provide identification, pay an amount, receive payment, redeem reward points, and/or the like. In the RF embodiments, instrument to instrument transactions may also be performed. See, for example, Sony's "Near Field Communication" ("NFC") emerging standard which is touted as operating on 13.56 MHz and allowing the transfer of any kind of data between NFC enabled devices and across a distance of up to twenty centimeters. See also, Bluetooth chaotic network configurations; described in more detail at http://www.palowireless.com/infotooth/whatis.asp, which is hereby incorporated by reference. Furthermore, data on a first RF device may be transmitted directly or indirectly to a second RF device to create a copy of all or part of the original device.

The transaction instrument may be associated with various applications which facilitate participation in various programs such as, for example, loyalty programs. A loyalty program may include one or more loyalty accounts. Exemplary loyalty programs include frequent flyer miles, on-line points earned from viewing or purchasing products or web-sites on-line and programs associated with diner's cards, credit cards, debit cards, hotel cards, calling cards, and/or the like.

The transaction instrument is normally associated with a transaction account. Generally, the user is both the owner of the transaction account and the participant in the loyalty program; however, this association is not required. For example, a participant in a loyalty program may gift loyalty points to a user who pays for a purchase with his own transaction account, but uses the gifted loyalty points instead of paying the monetary value.

The transaction instrument maintains a transaction account identifier linking the transaction instrument to a transaction account. A "transaction account identifier", "code," "account," "account number," "account code", "identifier," "loyalty number" or "membership identifier," as used herein, includes any device, code, or other identifier/indicia suitably configured to allow the consumer to interact or communicate with the system such as, for example, authorization/access code, Personal Identification Number (PIN), Internet code, other identification code, and/or the like that is optionally maintained on and/or by a NACV module, SIM card, rewards card, charge card, credit card, debit card, prepaid card, telephone card, smart card, magnetic strip card, bar code card, radio frequency card and/or the like.

The transaction account identifier may be distributed and stored in any form of plastic, electronic, magnetic, radio frequency, audio and/or optical device capable of transmitting or downloading data from itself to a second device. A transaction account identifier may be, for example, a sixteen-digit credit card number, although each credit provider has its own numbering system, such as the fifteen-digit numbering system used by an exemplary loyalty system. Each provider's credit card numbers comply with that provider's standardized format such that the provider using a sixteen-digit format may generally use four spaced sets of numbers, as represented by the number "0000 0000 0000 0000". The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer. In addition, loyalty account numbers of various types may be used.

The "transaction information" in accordance with this invention may include the nature or amount of transaction, as well as, a merchant, user, and/or issuer identifier, security codes, routing numbers, and the like. In various exemplary embodiments, one or more transaction accounts may be used to satisfy or complete a transaction. For example, the transaction may be only partially completed using the transaction account(s) correlating to the application tenant information stored on the transaction instrument with the balance of the transaction being completed using other sources. Cash may be used to complete part of a transaction and the transaction account associated with a user and the transaction instrument, may be used to satisfy the balance of the transaction. Alternatively, the user may identify which transaction account, or combination of transaction accounts, the user desires to complete a transaction. Any known or new methods and/or systems configured to manipulate the transaction account in accordance with the invention may be used.

In various exemplary embodiments, the transaction instrument may be embodied in form factors other than, for example, a card-like structure. As previously noted, the transaction instrument may comprise the NACV equipped device, a RF transponder, a speed pass, store discount card, or other similar device. The transaction instrument may furthermore be associated with coupons. A typical RF device which may be used by the present invention is disclosed in U.S. application Ser. No. 12/553,901, entitled "System and Method for Facilitating Secure Voice Communication Over a Network", which is commonly assigned, and which is hereby incorporated by reference.

One skilled in the art will appreciate that a network may include any system for exchanging data or transacting business, such as the Internet, an intranet, an extranet, WAN, LAN, satellite communications, cellular network, and/or the like. It is noted that the network may be implemented as other types of networks such as, for example, an interactive television (ITV) network. The users may interact with the system via any input device such as a keyboard, mouse, kiosk, personal digital assistant (e.g., Palm Pilot®.), hand-held computer, cellular phone, and/or the like. Similarly, the invention may be used in conjunction with any type of personal computer, network computer, workstation, mini-computer, mainframe, or the like running any operating system such as any version of Windows, Windows XP, Windows Vista, Windows NT, Windows 2000, Windows 98, Windows 95, MacOS, OS/2, BeOS, Linux, UNIX, Solaris, or the like. Moreover, although the invention is frequently described herein as being implemented with specific communications protocols, it may be readily understood that the invention could also be implemented using HTTP, TCP/IP, SMTP, Bluetooth, IPX, AppleTalk, IP-6, NetBIOS, OSI or any number of existing or future protocols. Moreover, the system may contemplate the use, sale or distribution of any goods, services or information over any network having similar functionality described herein.

With reference to FIG. 1, the computing units described herein may be connected one with the other via a data communication network 140. The network 140 may be a public network and assumed to be insecure and open to eavesdroppers. In the illustrated implementation, the network 140 may be embodied as a wireless network. In this context, the various devices and/or computing systems may or may not be connected to the wireless network 140 at all times. For instance, the communication device 105 may employ a modem to occasionally connect to the wireless network, whereas a payment gateway computing center 125 might maintain a permanent connection to the network either wirelessly or by way of wireline network. Specific information related to the protocols, standards, and application software utilized in connection with the Internet may not be discussed herein.

The various systems may be suitably coupled to the network 140 via data links. A variety of conventional communications media and protocols may be used for data links. For example, a connection to an Internet Service Provider (ISP) over the local loop as is typically used in connection with standard modem communication, cable modem, Dish networks, ISDN, Digital Subscriber Line (DSL), or various wireless communication methods. The merchant POS device 120 might also reside within a local area network (LAN) that interfaces to the network 140 via a leased line (T1, D3, etc.).

In addition to the communication device 105, the user may be equipped with a computing system to configure certain features of the profile gateway 130 and/or facilitate online commerce transactions. For example, the user may have a computing unit in the form of a personal computer, although other types of computing units may be used including laptops, notebooks, hand held computers, set-top boxes, and/or the like. The merchant may have a computing unit implemented in the form of a computer server, although other implementations are possible. A payment gateway 125 and/or profile gateway 130 may include a computing center such as a main frame computer. However, the computing center may be implemented in other forms, such as a mini-computer, a PC server, a network set of computers, or the like.

The profile gateway 130 may be configured to manipulate transaction account data associated with the corresponding issuer-owned data stored by the NACV module 110, a transaction instrument, and/or profile gateway database 135. For example, the profile gateway 135 may receive and store "transaction information", which may be formatted and transmitted to the payment gateway 125 for processing.

The profile gateway 130 may also be configured to interact with the communication device 105 directly or indirectly via any computing device, to individually manage data sets on the communication device 105. For example, the profile gateway 135 may manage data sets on the NACV module 110 of the communication device 105. In various embodiments, the data sets maintained at the profile gateway 130 may then be stored on communication device 105 when the communication device 105 is used to facilitate a transaction. In other embodiments, the profile gateway 130 stores data set information within its own systems, which may communicate with the communication device 105 via a user computer, a kiosk, or a merchant computer. In such embodiments, the profile gateway 135 may be configured to push the data set to the communication device 105 via a stand alone interaction device, a merchant computer, a kiosk, an interaction device, or a user computer, which may be configured to pull such information from the profile gateway 130.

In one embodiment, the user equipped with the communication device 105 may invoke a purchase transaction based on a selected transaction account without providing sensitive account information to a merchant or merchant POS device 120. As such, there is no need to collect sensitive Peripheral Component Interconnect (PCI) controlled accountholder data (i.e., Visa, MasterCard, American Express, etc.) at the POS device 120. Because of this, purchase transactions facilitated in accordance with the various embodiments are inherently more secure than traditional electronic payment transactions. For example, theft of transaction account information is meaningless because the transaction instrument is inextricably linked to the user and his communication device 105. A fraudster cannot use the transaction account unless he is in physical possession of the transaction account holder's communication device 105 and has knowledge of the associated PIN. The PIN may be entered at the POS device 120 or within a communication device 105 interface when a selected transaction instrument is used to facilitate a PIN-less transaction such as, for example, by way of a credit card. Because participating merchants are not bound by the PCI requirements and liability issues associated with traditional transaction instruments, merchants benefit from the use of the disclosed NACV module 110.

As described above, a PIN may be used with the communication device 105 even when the "authorization" account is a credit card account. The addition of the PIN provides an additional layer of security to the use of the communication device 105. For example, a PIN may be entered at a POS device 120 using a terminal PIN pad. However, in situations where the POS device 120 does not employ a PIN pad or when the transaction type does not conventionally require PIN entry (i.e., the card was presented as a credit card), the communication device 105 receives a SMS message prompting the account holder to enter a PIN.

While SMS messages generally use a lightweight form of encryption, the invention contemplates the integration of even more secure forms of encryption. For example, a standard SIM card within a communication device 105 may be replaced with the disclosed NACV module 110 that provides superior Public Key Infrastructure (PKI) based PIN entry that may be employed for Electronic Benefits Transfer (EBT) transactions on a non-PIN entry device. Also, a specialized application (i.e., transaction manager) may be loaded into an account holder's communication device 105. The transaction manager application is configured to collect and encrypt the PIN prior to transmission over a network.

The NACV module 110 may be configured to function with a variety of SIM equipped communication devices 105, whether or not the device is programmable. However, the transaction manager application is configured to function on programmable communication devices 105 (e.g., a "smart phone"). In either case, when the account holder presents a transaction instrument at the POS, a message is sent to the communication device 105 prompting the account holder to select a transaction account from which the payment shall be drawn. For example, account numbers relating to various transaction accounts (i.e., profiles) may be stored by the NACV module 110. A PIN is defined for each transaction account, which is also stored and is accessible by the communication device 105. When a transaction account (e.g., Chase Bank Visa) is selected by the account holder, the account holder is prompted to enter a PIN via a communication device 105 interface, which is verified against the stored PIN corresponding to the selected transaction account. The transaction account number is retrieved from the database and is transmitted to the appropriate gateway for authorization.

As used herein, an "interface" comprises any hardware, software, or combination thereof, which is configured to accept an input by any of the parties discussed herein. An "input" may be defined as, for example, key presses on a physical keyboard, button selection on a touch screen, a verbal command, a biometric sample, and the like. A biometric sample may include, for example, a fingerprint, iris scan, facial feature recognition, and the like. However, practitioners will appreciate that entry of a PIN, or any other indicia described herein, may be performed by any means known in the art.

The following includes examples of high-level use cases associated with the disclosed NACV module 110. As will be appreciated by one of ordinary skill in the art, the use cases disclosed herein are only examples and are by no means intended to fully document all possible scenarios. Moreover, it should be appreciated that the illustrated components are presented for explanation only and the described functionality may be performed by other components of the invention in various orders.

In accordance with one embodiment, the NACV module 110 functions as a GSM SIM for a specific network carrier. Although it may maintain other carrier network profiles, there may be only one default network profile active at a given moment. A network profile may be defined as the default network profile and operation when the NACV module 110 is initially invoked with a "Answer-to-Reset" message. The user may access other network profiles by selecting a new default network profile by way of a transaction manager interface or by any other means known in the art for selecting stored parameters. A default network profile may be selected to be temporarily active or to persist across communication device 105 power cycles.

A user may utilize a NACV equipped communication device 105 to perform authentication and encryption in much the same manner that a PIV card would be used in a separate smart card reader device. Both external servers (e.g., the profile gateway 135) and internal applications running on the communication device 105 may utilize a personal token in the authentication process. The internal applications may be configured to communicate with the personal token on the NACV module 110 either directly or through a Cryptographic Service Provider (CSP), for example. These applications may facilitate the use of the personal token to digitally sign and encrypt electronic material (e.g., emails, SMS, etc.) and may facilitate secure storage of data.

A server in communication with the communication device 105 may perform a two-factor authentication, for example, by sending an SMS message to the NACV equipped communication device 105. Accordingly, the SMS message is received by the transaction manager application of the NACV module 110, which invokes a PIN entry operation that is performed by the user. A successful PIN operation invokes a communication device 105 response that is transmitted back to the external server to provide the identity of the user.

In one embodiment, higher-security applications may implement a three-factor authentication through incorporation of a biometric such as, for example, a voice authentication. However, practitioners will appreciate that other biometric authentications may be implemented without departing from the scope of the invention.

To achieve the objectives of the invention, the disclosed systems may include various software modules (e.g., drivers, libraries, applications, etc.) that tether the NACV module 110 with the communication device 105 or profile gateway 130 for executing cryptographic operations. For example, the security framework residing on the profile gateway 130 incorporates the NACV module 110, thereby enabling other applications to utilize the cryptographic capabilities and the personal tokens. Accordingly, host applications may be configured to dynamically select the personal token needed for the requisite operation. The transaction manager application may further access multiple personal tokens and enable the NACV module 110 to behave as a multi-card smart card reader. The invention may, for example, provide a Microsoft Crypto Application Program Interface (MS-CAPI) driver to enable standard Microsoft applications to access the cryptographic functions on the NACV module 110 while hiding the underlying implementation. Similar CSP functions exist on other platforms such as, for example, the Key Chain in the communication device 105.

The NACV module 110 facilitates secure storage and retrieval of storage keys, which are used to encrypt user information. Moreover, the NACV module 110 facilitates secure storage and retrieval of session keys, which are used to encrypt secure communication sessions. While not fully inclusive, such keys typically take the form of 3DES (Data Encryption Standard), AES-128 (Advance Encryption Standard) or AES-256 keys, thus a total length of 32 bytes plus overhead may be sufficient. However, other present and future key platforms, as well as expanded memory sufficient to operate under such platforms are contemplated.

Support for any currently known or future implementation of encryption and hashing algorithms may be supported by the disclosed NACV module 110. Such encryption and hashing algorithms include, for example, DES, 3DES, AES-128, AES-192, AES-256, RSA, ECC, SHA-1, SHA-256, SHA-384, and the like.

An asymmetric key exchange algorithm is supported to assist in volume deployment of the subscriber communication device 105. This may include, for example, ECC Diffie-Hellman. Moreover, the NACV module 110 may support digital signature algorithms to assist in proof-of-identity and non-repudiation processes, which may include, for example, ECC, RSA, or DSA.

The NACV module 110 may be configured to prioritize internal applets in order to ensure that network operations meet or exceed the interoperability requirements for a specific remote communications network. Accordingly, for example, the NACV module 110 may be configured to recognize real-time operational requirements and assign them appropriate priority. The NACV module 110 may interleave lower priority requests as is deemed reasonable and feasible, thereby allowing multiple applications to serialize requests and responses while continuing to meet the network requirements for connectivity.

The ability to utilize multiple personal tokens allows a user to maintain a variety of separate tokens at a user's communication device 105. Such tokens may include, for example, tokens for financial transactions (EMV), corporate security (PIV), drivers license (PIV), medical records (PIV), government security (CAC), and the like. In accordance with one embodiment, the NACV module 110 may further include a personal token that has been selected as the default token. In another embodiment, the communication device 105 only maintains references to tokens maintained at the profile gateway 135. As such, sensitive information does not traverse the network and remains secure at the profile gateway 135.

Practitioners will appreciate that the disclosed NACV module 110 may provide additional benefits to governmental, organizational, and commercial operations that typically rely on smart card operations. For example, a NACV equipped communication device 105 may be considered for use in government programs, financial/retail value-add programs (i.e., loyalty, gift, etc.), health care, transportation, and the like. While the NACV module 110 is herein described in relation to specific uses, these uses are presented for explanation only and additional uses are contemplated.

The NACV module 110 is herein described as a card; however, practitioners will appreciate that the disclosed invention may be implemented in any number of forms. In an embodiment, wherein the disclosed invention is implemented within a physical card, the physical card may conform to any/all of the disclosed standards. However, the invention is not so limiting. Other current or future standards may be implemented without departing from the scope of the invention. Such standards may include, for example, ISO/IEC 7810 (Second Edition 1995): "Identification cards—Physical characteristics", ISO/IEC 7816-1 (1998): "Identification cards—Integrated circuit(s) cards with contacts—Part 1: Physical characteristics", ISO/IEC 7816-2 (1999): "Information technology—Identification cards—Integrated circuit(s) cards with contacts—Part 2: Dimensions and location of the contacts", appropriate FIPS 140-2 standards for physical security. Each of these standards is hereby incorporated by reference.

In various embodiments, the electrical interface to the NACV module 110 may conform to the standards defined by ISO/IEC 7816-3 (Second Edition 1997): "Information technology—Identification cards—Integrated circuit(s) cards with contacts—Part 3: Electronic signals and transmission protocols" and/or ISO/IEC 7816-3 (Second Edition 1997 Amendment 1 2002): "Information technology—Identification cards—Integrated circuit(s) cards with contacts—Part 3: Electronic signals and transmission protocols—Amendment 1: Electrical characteristics and class indication for integrated circuit(s) cards operating at 5V, 3V, and 1.8V", which are all hereby incorporated by reference.

The following description of the physical and electrical characteristics of the NACV module 110 is presented for explanation only. Those of ordinary skill in the art will appreciate that these characteristics may be modified without departing from the scope of the invention. However, in accordance with a specific embodiment, the electrical interface to the NACV module 110 may include the following features disclosed herein.

The NACV module 105 may operate from 5 volts (Class A) and 3 volts (Class B) and is configured to support character-level (T=0) and block-level (T=1) protocols with character-level (T=0) being defined as the default communications protocol. The NACV module 110 may support high transmission bit rates including 115,200 and a Precise Positioning Service (PPS) command to change the protocol and bit rate.

Partitions of the NACV module 110 may include applets or program modules as well as user information associated with a selected profile. Specifically, volatile memory of the NACV module 110 may be configured to maintain applets or program modules that mirror the functionality of those applications residing with various types of CAC, PIV, and EMV instruments. In other words, a specific applet may be configured to function as a unique transaction instrument. A default applet (e.g., a Visa credit card) may be identified to function as a persistent default applet, which is the applet "seen" by an external application after an Answer to Reset (ATR), for example.

The NACV module 110 memory may adhere to any number of specific provisions in accordance with various embodiments and implementations. Such provisions may include, for example, applets configured to maintain security between all or a subset of loaded applets. Accordingly, each applet may include its own unique user verification (e.g., PIN). The applets may also share available memory for data storage and data stored by one applet may or may not be accessible to another applet. In accordance with this embodiment, each profile is isolated, thereby providing additional assurance that data remains private and protected inside each specific profile.

Specific applets maintained by the NACV module 110 may include, for example, CAC—Common Access Card issued by the United States Department of Defense DMDC; NIST Interagency Report 6887 (2003): "Government Smart Card Interoperability Specification Version 2.1"; EMV—EMV (Version 4.2 Jun. 2008): "Integrated Circuit Card Specifications for Payment Systems"; GSM—GSM 11.11 (ETS 300 608): "Digital cellular telecommunications system (Phase 2), Specification of the Subscriber Identity Module—Mobile Equipment (SIM—ME) interface"; GSM 11.11 (ETS 300 977): "Digital cellular telecommunications system (Phase 2+), Specification of the Subscriber Identity Module—Mobile Equipment (SEM—ME) interface"; GSM 11.12 (ETS 300 641): "Digital cellular telecommunications system (Phase 2), Specification of the 3 Volt Subscriber Identity Module—Mobile Equipment (SIM—ME) interface"; PIV—NIST FIPS PUB 201-1 (March 2006): "Personal Identity Verification (PIV)".

The disclosed NACV module 110 includes sufficient storage memory to accommodate, for example, at least one GSM (or similar) profile, at least one PIV profile, and at least one EMV profile. As described herein, profiles maintain information that is required to establish a network connection, verify the user, validate the communication device, invoke a financial transaction, view transaction records, obtain physical access, and obtain electronic access. In one embodiment, storage requirements are minimized by maintaining profile indexes, which may be used to retrieve corresponding profile data from the profile gateway 130. Moreover, practitioners will appreciate that profile data may be stored within the onboard memory of the communication device 105 and/or a separate memory card attached thereto.

The NACV module 110 includes a processor configured to invoke the applets or program modules in response to an event. An event may include, for example, receipt of a SMS message from the profile gateway 130, receipt of a signal by way of NFC connection, invocation by the user, and etc. The processor may include hardware accelerators configured to perform cryptographic operations. Cryptographic operations may include, for example, multithreading requests for cellular network operations, user encryption operations, user payment operations, and the like.

A user may configure certain features of the NACV module 110 by way of the transaction manager interface, a personal computer, a POS device, and the like. For example, when invoked at the communication device 105, the transaction manager application reads configuration data from a volatile memory portion of the NACV module 110 and presents profile information in an interface display. As described herein, various profiles corresponding to a user may include information required to access a carrier's network, verify the user's identity, and facilitate a transaction using a payment instrument.

Practitioners will appreciate that the user may be prompted to provide a PIN or other credential in order to obtain access to profile information. When authenticated, the user may identify a default network profile from a list of stored network profiles. The memory portion of the NACV module 110 may store any number of profiles such that the user could utilize the wireless network of, for example, Verizon®, Sprint®, T-Mobile®, and the like from a single communication device 105 and without requiring hardware modification. As such, the user may interact with an interface to select a profile from a list of profiles. A selected profile is thereafter used to facilitate network operations such as placing calls, accessing the Internet, sending text messages, receiving email, and the like.

In one embodiment, the user may be restricted from invoking multiple network profiles simultaneously, such that a specific default profile will be used at each startup. In another embodiment, the user may define rules that will determine which profile is used under defined circumstances. For example, a user could use a single communication device 105 to serve as both a business phone and a personal phone. To accomplish this, the user may select a profile and then select phone numbers from a saved phonebook, such that when a selected phone number is subsequently dialed, the profile associated with the selected phone number is made active. When the call has terminated, the default profile may be automatically reactivated.

Moreover, a selected network profile may be saved, allowing the user to determine whether the saved profile should persist across card removal or communication device 105 restarts. In other words, a default network profile may be configured to activate at the time of communication device 105 startup, thereby allowing the NACV module 110 to appear as a standard SIM device for cellular network operations. This allows the NACV module 110 to be received and recognized across various existing communication devices.

A user may also identify a default personal identity and default transaction instrument profile to be applied to the NACV module 110. Accordingly, the NACV module 110 may support a default personal identity and transaction instrument profile, which is selectable and editable by the user by way of the transaction manager application. In one embodiment, the user may select a "no default profile" option, requiring selection of a specific transaction instrument profile prior to each transaction operation. For example, when the user receives a transaction authorization request from the profile gateway 130, the transaction manager presents the user with an authentication prompt, followed by a list of available transaction instrument profiles. The user selects a transaction instrument profile from the list and the NACV module 110 activates the selected profile to facilitate the purchase transaction. The NACV module 110 may be configured to preserve this setting persistently across NACV module 110 removal or communication device 105 restarts.

Figure 2:
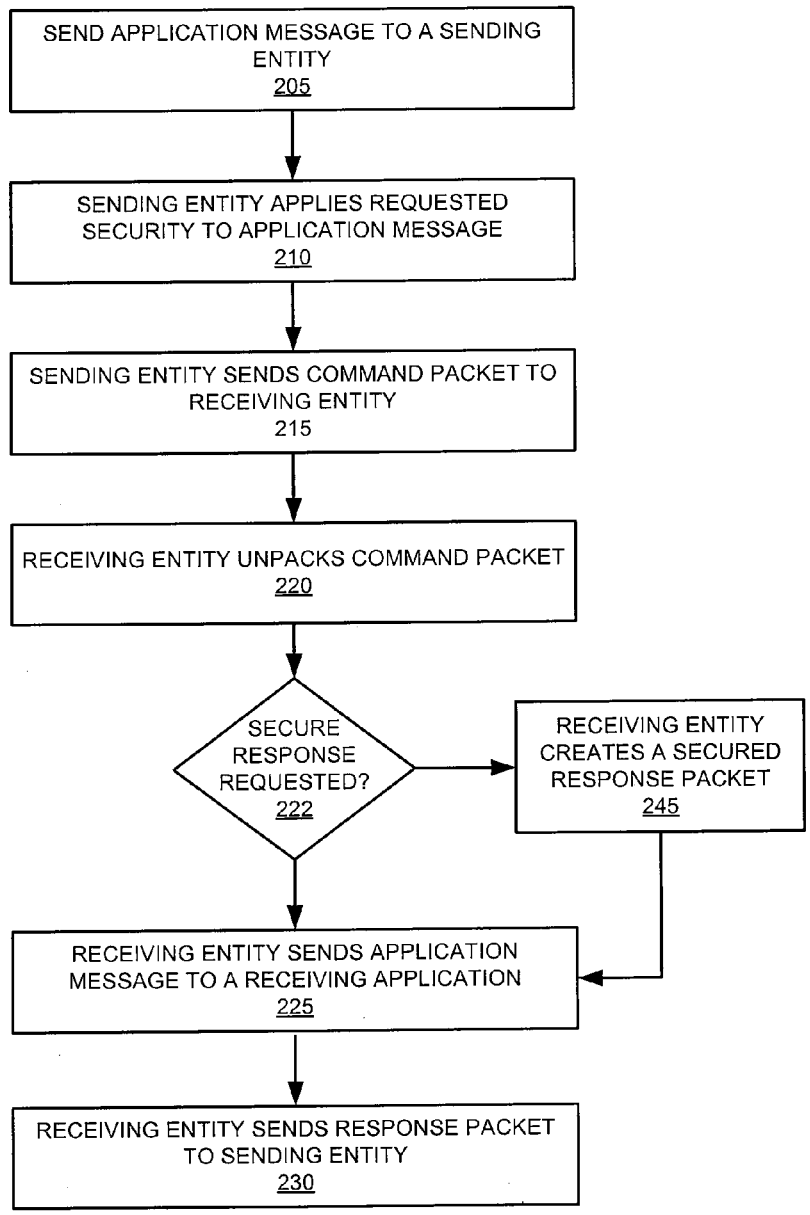
FIG. 2 is a flow diagram illustrating a record-based example for an authentication process for the disclosed NACV module in accordance with an exemplary embodiment of the present invention.

With reference to FIG. 2, the following paragraphs describe remote accessibility between a NACV equipped communication device 110 and a server (i.e., profile gateway 130). While reference is made to the current GSM standard, practitioners will appreciate that the described device and system remain applicable in light of any number of other protocols and standards. For example the GSM standard explicitly describes how a remote application securely accesses a SIM applet. However, it is anticipated that other standards based on varying programming architectures will be developed and implemented.

Messaging between the profile gateway 130 and the NACV equipped communication device 105, may be initiated by a sending application hosted by the profile gateway 130 (or any other remote server). The sending application prepares an Application Message and forwards it to a sending entity along with an indication of the security protocol to be applied to the Application Message (step 205). In one embodiment, the sending application may comprise a server or an application within another NACV equipped communication device 105.

The sending entity attaches a security header to the Application Message and applies the requested security protocol to the Application Message (step 210), thereby creating a Secured Command Packet. The sending entity transmits the Secure Command Packet through a transport mechanism to a receiving entity (step 215). The transport mechanism may use SMS, SMS-CB, SMS-PP, SMS-SC, USSD, or any other transport mechanism for sending the Secured Command Packet. The receiving entity receives the Command Packet and unpacks it in accordance with the security protocol (step 220). The receiving entity subsequently forwards the Application Message to the Receiving Application on the NACV module 110 indicating to the receiving application the security protocol that was applied (step 225). If indicated within the Application Message (step 222), the receiving entity may create a Secured Response Packet (step 225). The Secured Response Packet consists of a security header and optionally, application specific data supplied by the receiving application. The Secured Response Packet is returned to the sending entity (step 230) for processing as described herein.

The following describes embodiments that utilize both record-based and message-based techniques to facilitate the communication features of the present invention. While specific communication techniques are described herein, it should be understood that other techniques may be implemented, both now in the future, without departing from the scope of the invention. Moreover, the two techniques are utilized in accordance with specific network coverage issues.

The general communication technique comprises encapsulating ISO 7816 commands within an ISO 7816 frame. Accordingly, the NACV module 110 may receive frames from a host application through an ISO 7816 driver, for example. A NACV module 110 applet extracts the encapsulation header and/or trailer and processes each frames as an ISO 7816 encapsulated frame. The encapsulated frame may comprise any operation that is valid to a smart card and is specific to the applet's purpose.

The record-based embodiment includes overloading the read and write of records (files) to the NACV module 110 to interact with the various profiles. For example, the file names may include a pre-pending or qualifying a file name that directs read and write operations to a NACV module 110 system handler. The file may include a system qualifying name to access system information and application qualifying names as defined by the user. A profile allocation table, much like a file allocation table, may define the contents of the device's memory. The NACV module 110 also maintains status of a profile's qualified file name returns the status of the contained profile format to be defined. A NACV module 110 host application issues commands through a write operation and receives a response through a read operation.

In one embodiment, the transaction manager application accesses profiles through file operations. For example, the NACV module includes a "directory" corresponding to each of the profile types may exist, with each directory having a unique name for each profile. The following table represents an example file structure. Practitioners will appreciate that the following table and description is presented for explanation only. The system may include any number of directories and/or files in accordance with various embodiments.

| File Name/Attribute | Description | Characteristics |
| --- | --- | --- |
| Unnamed | Root directory | Default GSM |
| GSM | Directory name | Contains all GSM profiles |
| PIV | Directory name | Contains all PIV profiles |
| EMV | Directory name | Contains all EMV profiles |
| .apriva | Filename extension | Indicates a profile command/response queue |

A profile may be user-defined; however, it may also include a filename suffix (e.g., ".apriva"). Therefore, a file name of, "PIV/test-piv.apriva" describes the profile name in which to send and receive file commands. Profile data may be securely stored within this PIV/test-piv directory. Similarly, a file name of, "GSM/tmobile.apriva" is, for example, a file name for the T-Mobile® GSM profile. It too, may contain profile-specific data. Accordingly, the root directory is the default GSM, mounted as a root directory and available without requiring a directory qualifier.

Anticipating that a message-based approach may overload the message source and destination on the disclosed NACV module 110, profile applets are configured to respond by transmitting messages to the host application. Similar to the record-based approach, the message-based approach may include an encapsulated frame that is destined for another applet in the disclosed NACV module 110.

With reference to FIG. 3, on startup, the host applications perform standard network interaction with the NACV module 110 to register the user on the subscriber network (step 305). A transaction manager application presents a prompt requesting the user's authentication credential. The authentication credential may comprise a password, PIN, biometric, or any combination thereof. The user enters or provides the authentication credential, which is required to unlock the communication device (step 310).

When the communication device has been unlocked, a Cryptographic Service Provider (CSP) utilizes a communication device API to read a Profile Allocation Table (PAT) to determine how to address the encapsulated data (step 315). On receiving the PAT data, the CSP identifies a PIV to utilize (e.g., "my-piv") and creates a file-write operation to the identified data element (step 320). The data is written to the encapsulated command/request, a Card Holder Verification (CHV) in this case. This encapsulated/overloaded write command is sent using the API and the write command is converted into an ISO 7816 command by the driver (step 325). On completion of the write command, the application issues a read command to read the response from the NACV module 110 (step 330). The read command serves as a blocking operation, awaiting a response or timeout of the NACV module 110 request.

The NACV module 110 dispatcher receives the command and recognizes the extension and command as an encapsulated write command, which is destined for the specified applet (step 335). The NACV module 110 "dispatcher" then directs the request to the specified applet and provides a conduit for the response message (step 340).

The following descriptions set forth additional embodiments, combining the features of the NACV module 110 with the features of the profile gateway 130. Those of ordinary skill in the art will appreciate that the previously described features of the NACV module 110 allow the communication device 105 to facilitate secure transactions over a wireless network by effectively transforming the communication device 105 into both a transaction instrument and transaction instrument reader. Moreover, because the NACV module 110 is configured to store multiple network access and personal identity verification profiles, the following financial transactions can be efficiently facilitated while minimizing or eliminating the need to provide sensitive transaction account information to a merchant and/or merchant POS device.

In one embodiment, the NACV module 110 facilitates a transaction using a proxy account code that can be stored in a profile and securely transmitted over a network. The proxy account code corresponds to any number of unique transaction account numbers belonging to a user. The proxy account code and a secret code (i.e., PIN) representing a selected transaction account are sent from a transaction instrument 105 and/or merchant POS device 120 to the profile gateway 130 (by way of a payment gateway 125). The profile gateway 130 authenticates the proxy account code and PIN, locates a corresponding transaction account code stored in the profile database 135, and sends the transaction account code to a payment gateway 125 for processing in the conventional manner.

In accordance with the foregoing embodiment, the user can, for example, execute a payment transaction at the POS device 120 using the proxy account code, which is linked to other payment methods and transaction accounts. Such transactions may be facilitated by way of a transaction instrument taking the form of, for example, a NACV module 110 equipped cellular phone. Accordingly, the proxy account code may utilize existing payment mechanisms for transporting and processing conventional transaction account codes.

Any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Binary Large Object (BLOB). Thus, any binary information may be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data, which also may be distinct from other subsets.

The data set annotation may be used for various types of status information as well as other purposes. For example, the data set annotation may include security information establishing access levels. The access levels may, for example, be suitably configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified merchants are permitted to access the data set for reading, and others are altogether excluded from accessing the data set. However, other access restriction parameters may also be used allowing various entities to access a data set with various permission levels as appropriate.

One skilled in the art will also appreciate that, for security reasons, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

The present invention may be described herein in terms of functional block components, optional selections and/or various processing steps. It should be appreciated that such functional blocks may be realized by any number of hardware and/or software components suitably configured to perform the specified functions. For example, the present invention may employ various integrated circuit components, e.g., memory elements, processing elements, logic elements, look-up tables, and/or the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), Microsoft.Net with the various algorithms being implemented with any combination of data structures, objects, processes, routines or other programming elements. Further, it should be noted that the present invention may employ any number of conventional techniques for data transmission, messaging, data processing, network control, and/or the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by Mayiam Stalling, published by Prentice Hall; all of which are hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. It should be noted that many alternative or additional functional relationships or physical connections might be present in a practical transaction instrument distribution system.

As may be appreciated by one of ordinary skill in the art, the present invention may be embodied as a method, a data processing system, a device for data processing, a financial transaction instrument, and/or a computer program product. Accordingly, the present invention may take the form of an entirely software embodiment, an entirely hardware embodiment, or an embodiment combining aspects of both software and hardware or other physical devices. Furthermore, the present invention may take the form of a computer program product on a tangible computer-readable storage medium having computer-readable program code means embodied in the storage medium. Any suitable tangible computer-readable storage medium may be utilized, including hard disks, CD-ROM, optical storage devices, magnetic storage devices, and/or the like.

These computer program instructions may also be stored in a computer-readable memory that may direct a computer or other programmable data processing apparatus to function in a particular manner, such that the instructions stored in the computer-readable memory produce an article of manufacture including instruction means which implement functions of flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus include steps for implementing the functions specified in the flowchart block or blocks.

In the foregoing specification, the invention has been described with reference to specific embodiments. However, it may be appreciated that various modifications and changes may be made without departing from the scope of the present invention. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

I claim:

1. A smart card device for providing wireless network and secure personal token features to a communication device, said smart card device comprising:
    a Network Access and Credential Verification (NACV) module for storing a plurality of transaction instrument profiles;
an interface element for receiving a selection of a first transaction instrument profile from said plurality of transaction instrument profiles;
    a processor element in communication with said NACV module and said interface element,
        wherein said processor element is configured to transmit a first payment entity parameter stored within said first transaction instrument profile to a gateway server to facilitate a transaction;
        receive a first confirmation from said gateway server based on said transaction;
    and transmit a second payment entity parameter stored in a second transaction instrument profile to said gateway server;
    wherein at least one of said first confirmation or a second confirmation includes a payment entity identifier;
    wherein said payment entity identifier corresponds to an entity responsible for transferring a monetary sum to a recipient of said transaction;
    wherein the Network Access and Credential Verification (NACV) module facilitates electronic transactions between the smart card device and a NACV server in the wireless network, the NACV module a uses a short-message peer-to-peer (SMPP) browser to present details of the transactions;

wherein a Single-Wire Protocol (SWP) provides a direct interface between the NACV module and a short-range radio in the communication device, wherein the short-range radio is one of a Near Field Communication (NFC) or Bluetooth.

2. The smart card device of claim 1, wherein each of said plurality of transaction instrument profiles includes at least one of: a user identifier, a verification identifier, or an account identifier.

3. The smart card device of claim 1, wherein said NACV module includes at least one of: a network profile or an identity profile.

4. The smart card device of claim 3, wherein said a network profile includes at least one of: a network identifier or a subscriber identifier.

5. The smart card device of claim 3, wherein said identity profile includes at least one of: a user identifier or a verification credential.

6. The smart card device of claim 1, wherein said gateway server facilitates a transaction authorization based on receiving at least one of: a first parameter or a second parameter.

* * * * *